(12) United States Patent
Baiyor et al.

(10) Patent No.: US 6,307,929 B1
(45) Date of Patent: *Oct. 23, 2001

(54) APPARATUS, METHOD AND SYSTEM FOR PROVIDING CONDITIONAL ANSWERING IN MULTIPLE LEG TELECOMMUNICATION SESSIONS

(75) Inventors: Robert John Baiyor; Deborah Thomas Earl, both of Naperville; Harold Robert Smith, Jr., Oakbrook Terrace; Thomas Dale Strom, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,578

(22) Filed: Apr. 26, 2000

(51) Int. Cl.[7] .............................. H04M 3/42; H04M 7/00
(52) U.S. Cl. ................................ 379/211.02; 379/211.01; 379/207.1; 379/219; 370/58.2; 370/94.1
(58) Field of Search ......................... 379/211.02, 211.01, 379/207.1, 219; 370/58.2, 94.1

(56) References Cited

U.S. PATENT DOCUMENTS 5,426,634 * 6/1995 Cote et al. ........................... 370/58.1
6,111,943 * 9/1998 Strom et al. ..................... 379/211.01

* cited by examiner

Primary Examiner—Ahmad Matar
Assistant Examiner—Thjuan P. Knowlin
(74) Attorney, Agent, or Firm—Nancy R. Gamburd (57) ABSTRACT

An apparatus, method and system provide for conditional answering in multiple leg telecommunication sessions, such as in a flexible alerting service. The preferred system includes a home location register (HLR) coupled to a mobile switching center (MSC). The HLR has, stored in a memory, a plurality of secondary directory numbers associated with a primary directory number, such as an ANSI compatible pilot directory number. The MSC has an interface for receiving an incoming call leg designating the primary directory number and for processing and routing each outgoing call leg associated with each secondary directory number. Following reception of a directive from the HLR, the MSC obtains information from a calling party to create called party information. When an outgoing call leg has been conditionally answered, the MSC provides the called party information on the conditionally answered outgoing call leg. Upon reception of the information, the called party may decide to accept the call, through an unconditional answer, or may hold or release the call. In the preferred embodiment, the called party information may include options or selections entered by the calling party, the name of the calling party, routing information, language selections, and product or service selections. Following an unconditional answer of an outgoing call leg, the MSC provides a connection between the unconditionally answered outgoing call leg and the incoming call leg to form a communication session.

54 Claims, 6 Drawing Sheets

APPARATUS, METHOD AND SYSTEM FOR PROVIDING CONDITIONAL ANSWERING IN MULTIPLE LEG TELECOMMUNICATION SESSIONS

CROSS-REFERENCE TO RELATED APPLICATIONS

This application is related to Baiyor et al., U.S. Pat. No. 6,009,159, entitled "Apparatus, Method And System For Controlling The Start Of Alerting Of Multiple Leg Telecommunication Sessions", filed Jun. 15, 1998 and issued Dec. 28, 1999, commonly assigned to Lucent Technologies, Inc., and incorporated by reference herein, with priority claimed for all commonly disclosed subject matter (the "first related patent").

This application is related to Baiyor et al., U.S. Pat. No. 6,005,930, entitled "Apparatus, Method And System For Controlling Secondary Treatment By a Distant Switch Of Multiple Leg Telecommunication Sessions", filed Jun. 15, 1998 and issued Dec. 21, 1999, commonly assigned to Lucent Technologies, Inc., and incorporated by reference herein, with priority claimed for all commonly disclosed subject matter (the "second related patent").

This application is related to Baiyor et al., U.S. patent application Ser. No. 09/097,527, entitled "Apparatus, Method And System For Providing Information To A Called Party In Multiple Leg Telecommunication Sessions", filed Jun. 15, 1998, commonly assigned to Lucent Technologies, Inc., and incorporated by reference herein, with priority claimed for all commonly disclosed subject matter (the "third related application").

This application is related to Baiyor et al., U.S. patent application Ser. No. 09/342,499, entitled "Apparatus, Method And System For Providing Variable Alerting Patterns For Multiple Leg Telecommunication Sessions", filed Jun. 29, 1999, commonly assigned to Lucent Technologies, Inc., and incorporated by reference herein, with priority claimed for all commonly disclosed subject matter (the "fourth related application").

This application is related to Baiyor et al., U.S. patent application Ser. No. 09/350,577, entitled "Apparatus, Method And System For Providing Call Progress Information For Multiple Leg Telecommunication Sessions For Intelligent Network Services", filed Jul. 9, 1999, commonly assigned to Lucent Technologies, Inc., and incorporated by reference herein, with priority claimed for all commonly disclosed subject matter (the "fifth related application").

This application is related to Baiyor et al., U.S. patent application Ser. No. 09/350,439, entitled "Apparatus, Method And System For Providing Variable Termination Patterns For Multiple Leg Telecommunication Sessions", filed Jul. 9, 1999, commonly assigned to Lucent Technologies, Inc., and incorporated by reference herein, with priority claimed for all commonly disclosed subject matter (the "sixth related application").

This application is related to Baiyor et al., U.S. patent application Ser. No. 09/404,901, entitled "Apparatus, Method And System For Subscriber Control Of Timed And Regional Membership In Multiple Member Termination Groups For Multiple Leg Telecommunication Sessions", filed Sep. 24, 1999, commonly assigned to Lucent Technologies, Inc., and incorporated by reference herein, with priority claimed for all commonly disclosed subject matter (the "seventh related application").

This application is related to Baiyor et al., U.S. patent application Ser. No. 09/455,623, entitled "Apparatus, Method And System For Telecommunication Conferencing Services In A Multiple Leg Telecommunication Session", filed Dec. 7, 1999, commonly assigned to Lucent Technologies, Inc., and incorporated by reference herein, with priority claimed for all commonly disclosed subject matter (the "eighth related application").

FIELD OF THE INVENTION

The present invention relates in general to telecommunication systems and services, and more particularly, to an apparatus, method and system for providing conditional answering in a multiple leg telecommunication session.

BACKGROUND OF THE INVENTION

With the advent of increasingly sophisticated telecommunication services, various services and systems are currently available that provide a called party with information pertaining to an incoming call, prior to answering, resulting in a call screening capability. This call screening capability may be limited, however, due to the types of information typically provided. For example, a calling party number and calling party name service (commonly referred to as "caller ID") displays the directory number of the telephone originating the call, but does not provide any information concerning how the call was routed or what the called party directory number may have been.

Additional types of information for provision to a called party may be particularly useful for new forms of telecommunication services. One such new telecommunication service allows a single call, incoming to a telecommunication switch, to branch into multiple, independent outgoing calls (or legs) to different called parties, during the same period of time. Once such proposed service is included in the ANSI-41 specification promulgated by the American National Standards Institute for wireless telecommunication, such as cellular communication, and is referred to as "flexible alerting". In a multiple outgoing call leg service such as flexible alerting, an incoming call to a primary (or "pilot") directory number is branched into multiple outgoing call legs to secondary directory numbers (which were previously specified as part of a flexible alerting group associated with the primary directory number). The ANSI-41 flexible alerting specification, however, does not include any specific directions or guidelines for types of information to be provided to called parties in such independent, concurrent outgoing multiple leg calls.

The use of these multiple outgoing call leg telecommunication services, such as "flexible alerting", raise new issues for the provision of information to called parties. With such flexible alerting, there is a loss of a 1:1 correlation between the directory number dialed and the directory number alerted. For instance, any given telephone (i.e., directory number) may receive calls through multiple paths, such as calls made directly to its directory number (directly dialed), and calls made indirectly, through the flexible alerting group (primary directory number dialed, with subsequent routing to that given directory number). As a consequence, in screening incoming calls, a called party may want to know if his or her telephone was alerted directly, by a direct call to their directory number, or indirectly, through membership in any number of flexible alerting groups.

The provision of additional information to the called party, such as routing information or information pertaining to the purpose of the call, is significant for other purposes as well. For example, in a multiple leg telecommunication session, additional information may allow an alerted party to refrain from answering a call, allowing other, more appropriate members of a flexible alerting group to answer the call, such as those with particular language capabilities or familiarity with specified subjects.

As a consequence, a need remains for an apparatus, method and system both provide a called party with additional information for call screening, and to allow a called party to conditionally answer an incoming call to receive the additional information. Such additional information should include call routing information, call purpose information, or other types of information designated by the consumer. Such conditional answering should also provide an alerted party with the ability to conditionally answer an incoming call, without releasing or dropping other outgoing call legs while the alerted party is receiving the additional information. In addition, such an apparatus, method and system should also be user friendly, user transparent, and capable of implementation in existing telecommunication equipment.

SUMMARY OF THE INVENTION

A system, apparatus and method provide conditional answering by a called party in multiple leg telecommunication sessions, such as in a flexible alerting service. The various embodiments of the present invention both allow a called party to conditionally answer an incoming call and provide a called party with additional types of information, enabling a significant level of call screening. In the preferred embodiment, the additional, called party information includes call routing information, call purpose information, and other types of information designated by the consumer.

The preferred system embodiment includes a home location register (HLR) coupled to a mobile switching center (MSC). In the preferred system embodiment, a MSC receives an incoming call leg designating a primary directory number ("DN"). A subscriber or other user of flexible alerting (or other multi-leg communication services) typically predefines a group of other directory numbers, referred to herein as secondary DNs, which are to be associated with the primary DN, such that when a call is placed to the primary DN, all of the secondary DNs are alerted. Such a list or grouping may be referred to as a flexible alerting group, or more broadly as an alerting group. In general, the incoming call to the primary DN is then processed and routed by a MSC, which then directs the incoming call to the multiple different mobile or wireline secondary DNs of the user's predefined alerting group, creating multiple different outgoing communication legs to these differing and independent directory numbers.

More specifically, in the preferred embodiment, when a MSC receives an incoming call leg to the primary DN, it requests call treatment instructions from the HLR, typically utilizing a location request. In accordance with the present invention, the HLR then directs the MSC to obtain "called party information" from the calling party. Typically, the MSC may provide the calling party with a menu of options, such as language selections, and choices of different kinds of products or services. In addition, the MSC may request the name of the calling party and the purpose of the call. This information may be transmitted to the HLR, while some of the information (such as the calling party name and purpose of the call) may be stored for re-transmission to a called party. Based upon this information, the HLR may select a subset of secondary DNs from the alerting group, such as those secondary DNs corresponding to called parties with fluency in a particular language or who support particular services or products. The HLR then provides the MSC with a listing of the secondary DNs to which outgoing call legs are to be routed, and the MSC then processes and generates outgoing call legs to these secondary DNs.

The MSC further provides conditional answering of these outgoing call legs. Such a conditional answering may be configured in a variety of ways, such as by entry of a predetermined code by a called (alerted) party, such as *SEND or *TALK, or simply by going off hook. When an outgoing call leg is conditionally answered, the MSC provides the called party information on the conditionally answered outgoing call leg, but does not then connect the conditionally answered outgoing call leg to the incoming call leg to form a communication session. The called party of the conditionally answered outgoing call leg may then utilize the called party information as desired, such as to screen the call, and may then unconditionally answer, hold or release the outgoing call leg. Other outgoing call legs continue to be alerted and may also be conditionally answered, with the provision of called party information, or may remain unanswered, or may be unconditionally answered. Whichever outgoing call leg is first to be unconditionally answered will receive the call and be connected to the calling party, with the other call legs released (i.e., dropped or torn down, with their corresponding alerting ceased), including other outgoing call legs which may have been conditionally answered previously.

The various embodiments of the present invention both allow a called party to conditionally answer an incoming call and provide a called party with additional types of information, enabling a significant level of call screening. In the preferred embodiment, the additional, called party information includes call routing information, such as a specification of the primary DN called, call purpose information, and other types of information designated by the consumer. For example, the information provided to the called party may include responses from the calling party, such as option or menu selections, or may identify specific flexible alerting groups, providing the called party with information pertaining to the purpose or routing of the call, and enabling the most suitable member of a flexible alerting group to respond to the call. The various embodiments of the present invention also provide an alerted party with the ability to conditionally answer an incoming call and receive the additional information, without being connected to the calling party and without releasing or dropping other outgoing call legs to other members of the alerting group. In addition, the apparatus, method and system of the present invention are user friendly, user transparent, and capable of implementation in existing telecommunication equipment.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiments in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system both to provide a called party with additional types of information and to allow a called party to conditionally answer an incoming call. In accordance with the present invention, an apparatus, method and system are provided which both provide a called party with such additional information for call screening, and which allow a called party to conditionally answer an incoming call to receive the additional information. In the preferred embodiment, the additional information includes call routing information, call purpose information, and other types of information designated by the consumer. For example, the information provided to the called party may include responses from the calling party or may identify specific flexible alerting groups, thereby providing the called party with information pertaining to the purpose or routing of the call. The various embodiments of the present invention also provide an alerted party with the ability to conditionally answer an incoming call and receive the additional information, without being connected to the calling party and without releasing or dropping other outgoing call legs to other members of the alerting group. In addition, the apparatus, method and system of the present invention are user friendly, user transparent, and capable of implementation in existing telecommunication equipment.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary DNs are alerted. Such a list or grouping may be referred to as a flexible alerting group, or more broadly as an alerting group or a secondary DN group. The incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. Such flexible alerting may also be useful for other business and personal uses, such as multiple calls to a home, office, and cellular telephone. For example, a child may call a single DN, namely, a parent s pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

As a consequence, for the purposes of the present invention, a person referred to as a called party may receive telecommunication calls in at least two different ways. First, the called party may receive calls directly via incoming calls placed to their directory number. Second, if their directory number is defined as a secondary DN in an alerting group, they may receive calls indirectly via incoming calls placed to the pilot DN (or primary DN) of the alerting group. Similarly, a called party may also receive calls indirectly through call forwarding, via incoming calls placed to a different directory number of the called party. The present invention is directed to enabling the called party to conditionally answer an outgoing call leg to receive types of information to distinguish between these two types of calls, direct and indirect calls (such as flexible alerting calls), and to determine whether they are the most appropriate member (of a flexible alerting group) to unconditionally answer the incoming call leg.

Typically, when an individual answers a call, such as by going off-hook or by pressing a SEND (TALK, or equivalent) button, that call is answered "unconditionally", such that the called party is immediately connected to the calling party for a communication session. In accordance with the present invention, however, an individual may "conditionally" answer a call and receive additional information, transparently to the calling party, and without the called party being connected to the calling party for a communication session. Following a conditional answer, the called party may further decide to accept (unconditionally answer) or reject (decline to unconditionally answer) the call; in the event the called party does accept the call, then and only then is the called party connected to the calling party for a communication session.

More specifically, in accordance with the present invention, when a called party has been alerted (on an outgoing call leg of a multiple outgoing call leg session), the called party may "conditionally answer" the outgoing call leg, such as by going off hook, by pressing a "SEND" button (or its equivalents, such as a TALK button), or by entering a predesignated code, such as "*SEND" or "*3", for example. Following such a conditional answer, information is provided to the called party, such as a verbal message provided by the calling party or a designation of which flexible alerting group was called. During this time, other members of the flexible alerting group may also be conditionally (or unconditionally) answering their corresponding outgoing call legs. Following a conditional answer, the called party may accept (unconditionally answer) the outgoing call leg, or may release (reject) the outgoing call leg (such as by pressing an "end" button or by going on hook). Whichever outgoing call leg is first to provide an unconditional answer will receive the call and be connected to the calling party, with the other call legs released (i.e., dropped or torn down, with any corresponding alerting ceased).

Figure 1A:
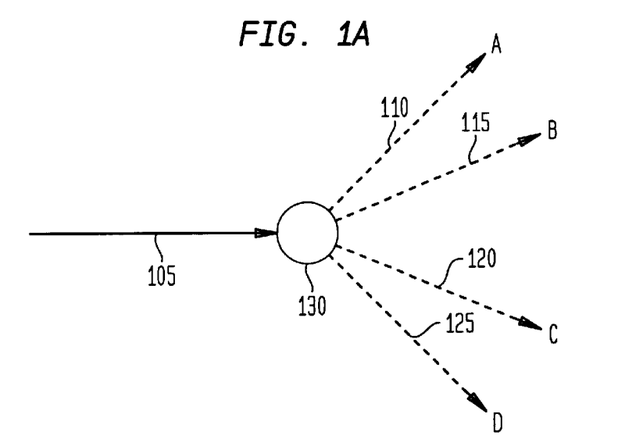
FIG. 1A is a graphical diagram illustrating alerting of multiple outgoing communication sessions commencing upon processing of an incoming call to a network switch.

The ANSI-41 specification does not address any issue concerning either conditional answering of an outgoing call leg or the provision of information to a called party pertaining to the routing or purpose of the outgoing call. Rather, the ANSI-41 specification merely addresses and requires that an incoming call to a pilot DN be routed to associated secondary DNs of the flexible alerting group, with the calling party ultimately connected to an answering party. FIG. 1A is a graphical diagram illustrating alerting of multiple outgoing communication sessions commencing upon processing of an incoming call (incoming call leg 105) to a network switch 130.

As illustrated in FIG. 1A, an incoming call leg 105 is received and processed by a network switch 130 (discussed in greater detail below). Following processing of the incoming call leg, call placement and other processing commences for four independent outgoing communication sessions A, B, C, and D, namely outgoing call legs 110, 115, 120 and 125 respectively (illustrated as dashed lines). These various outgoing call legs may be routed to any type of wireline or wireless secondary DN. Similarly, the outgoing call legs may be routed through one or more nodes, which may be any combination of PSTN (public switched telephone network), satellite, packet-based, or wireless nodes, or may require an additional mobile paging message to locate a mobile telephone. As these calls are processed, the switch 130 presumably (and with reasonable certainty) has no a priori or other advanced knowledge concerning which, if any, of the outgoing call legs 110, 115, 120 and 125 will be unconditionally answered. As a consequence, in accordance with the invention of another related patent application of Lucent Technologies, Inc., an open connection is maintained between the incoming call leg 105 and all of the outgoing call legs 110, 115, 120 and 125, unless and until one of the outgoing call legs is, in fact, unconditionally answered by a called party. Once one of the outgoing call legs 110, 115, 120 and 125 is unconditionally answered, then a voice path, connection or link will be established between the incoming call leg 105 and the unconditionally answered outgoing call leg.

Figure 1B:
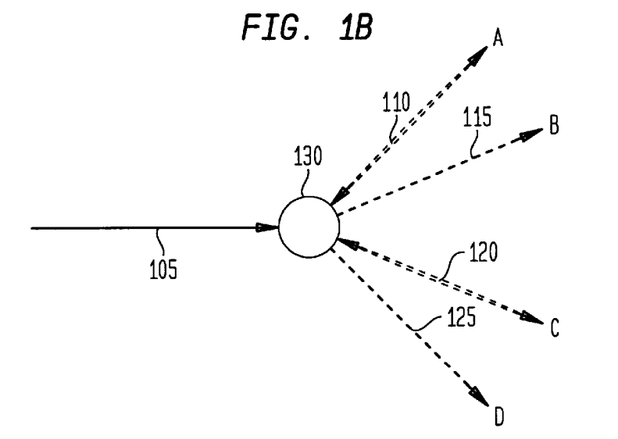
FIG. 1B is a graphical diagram illustrating conditional answers during alerting of multiple outgoing communication sessions in accordance with the present invention.

FIG. 1B is a graphical diagram illustrating an exemplary conditional answering of two outgoing call legs of the flexible alerting illustrated in FIG. 1A. As illustrated in FIG. 1B, called parties A and C have conditionally answered their respective outgoing call legs 110 and 120 (illustrated by double dashed lines). In the preferred embodiment, the called party may conditionally answer their outgoing call leg in any number of predefined ways, such as by going off-hook or pressing the * button followed by the SEND button. Since the outgoing call legs 110 and 120 are only conditionally answered, an open connection continues to be maintained between all of the outgoing call legs (110, 115, 120 and 125) and the incoming call leg 105. In addition, the other outgoing call legs which have not (yet) been conditionally or unconditionally answered (outgoing call legs 115 and 125) are not being released or dropped by the network switch 130. Moreover, during the period that called party A is conditionally answering the outgoing call leg 110, information is being transmitted to the called party A, and during the period that called party C is conditionally answering the outgoing call leg 120, similar information is also being transmitted to the called party C.

Continuing to refer to FIG. 1B, while either called party A or called party C is receiving called party information, any one of the outgoing call legs may be unconditionally answered. For example, during or after reception of such information, called party A may decide to unconditionally answer the call, or to not answer the call. Once one of the outgoing call legs 110, 115, 120 and 125 is unconditionally answered, a connection or link is established between the incoming call leg 105 and the unconditionally answered outgoing call leg, and the other unanswered or conditionally answered outgoing call legs are released, as discussed below with reference to FIG. 1C.

Figure 1C:
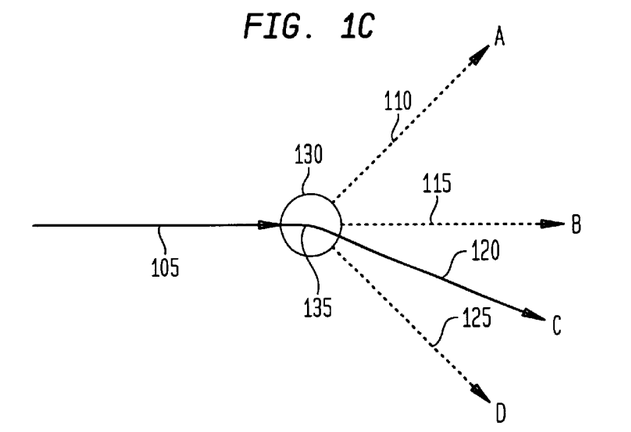
FIG. 1C is a graphical diagram illustrating connection of an unconditionally answered outgoing communication call leg with an incoming call leg to form a communication sessions, with the release of remaining outgoing call legs, in accordance with the present invention.

FIG. 1C is a graphical diagram illustrating connection of an unconditionally answered outgoing communication call leg with an incoming call leg to form a communication sessions, with the release of remaining outgoing call legs, in accordance with the present invention. As illustrated in FIG. 1C, for example, called party C has unconditionally answered the outgoing call leg 120 (illustrated as a solid line). Consequently, a connection or link 135 is or has been established between the incoming call leg 105 and the unconditionally answered outgoing call leg 120 to form a full duplex communication session, and the other outgoing call legs 110, 115 and 125 are being or have been released or dropped (illustrated as dotted lines). While in this case outgoing call leg 120 has been the first of the outgoing call legs to provide an unconditional answer (and therefore be connected to the incoming call leg 105), it should be noted that any outgoing call leg which is first to provide an unconditional answer will be connected to the incoming call leg, not just an outgoing call leg which previously provided a conditional answer.

As mentioned above, information (referred to herein as "called party information") is provided by the switch 130 on all conditionally answered outgoing call legs, in this case outgoing call legs 110 and 120, as illustrated in FIG. 1B. Accordingly, any called party that has conditionally answered their respective outgoing call leg receives the called party information, and thereby may screen the outgoing call leg. An important aspect of the present invention is that any conditionally answered outgoing call leg (such as 110 and 120) is not, without more, connected to the incoming call leg from the calling party. As a consequence, the conditional answering occurs transparently to the calling party. Moreover, when any of the outgoing call legs (110 and 120) have been conditionally answered, the network switch 130 does not release or drop the other outgoing call legs, namely, outgoing call legs 115 and 125. Rather, such outgoing call legs are dropped or released only following an unconditional answer of an outgoing call leg, such as outgoing call leg 120 of FIG. 1C.

In the preferred embodiment, the called party information consists of an audible message for perception by a listener. For instance, when the information is a message, the message may alert the called party that the call session is a multiple leg telecommunication session. The message also may provide the called party with a distinguishing group identifier, such as an alerting group name or number, or the primary directory number called (or other designation of a flexible alerting group), in order to assist the called party in distinguishing one flexible alerting group from another, such as distinguishing a business group from a family group. The information provided to the called party may also indicate the number of outgoing call legs which are being alerted, also to assist in determining whether the called party should unconditionally answer the outgoing call leg. For more advanced embodiments, the calling party may be asked by the system (such as systems 200 or 300, below) to provide certain types of information, such as language requirements or product requirements; this information also is then provided on outgoing call legs which have been conditionally answered.

Other information which may be useful for a called party may also be transmitted. Such information may include a notification of the language of the calling party, such English or Spanish, to enable the most appropriate member of a flexible alerting group to respond to the call. Other types of calling party information, such as information pertaining to particular products, also may be provided that may be appropriate or useful in directing the incoming call leg to the most suitable called party. For example, information pertaining to particular products may be useful for an alerting group for sales or for repairs. This type of information may be designated when a flexible alerting group is originally established and may be modified over time. In the preferred embodiment, a menu of choices pertaining to this type of information is provided to the calling party, who may then make an appropriate choice, such as by pressing "1" for English, "2" for Spanish, or pressing "3" for cellular and "4" for PCS.

As indicated above, various options are available to the called party for providing a conditional answer (and screening incoming calls) and/or providing an unconditional answer. In the preferred embodiment, the called party may provide an encoded conditional answer that includes screening capability. For example, for a called party who is a member of several alerting groups, upon being alerted, the called party may enter a "*3" or a "3SEND", providing a conditional answer indicating that the called party is to be connected to a call only from their alerting group number 3. Similarly, the called party may enter a "#3" or similar code for a negative conditional answer and screening, indicating that the called party is to be connected to a call only from any alerting group other than their alerting group number 3. When any of these conditions conditions is met, the called party does not need to perform any further actions to be connected to the incoming call leg.

In addition to output of an audible message, other means such as visual displays (on mobile units 130, discussed below) may also provide the called party with the ability to screen calls. First, in addition to caller ID display, additional information such as a "*" (star), a "#" (pound), a special digit sequence (such as "99"), or any other distinctive identifier or other mark, may be added as a prefix or suffix to a displayed calling number and/or name in order to designate a flexible alerting call. In addition, the called directory number could also be displayed, indicating to the called party whether the outgoing call leg was a flexible alerting call (displaying the pilot or primary DN), or whether the call was a direct call (displaying the called party's directory number).

Figure 2:
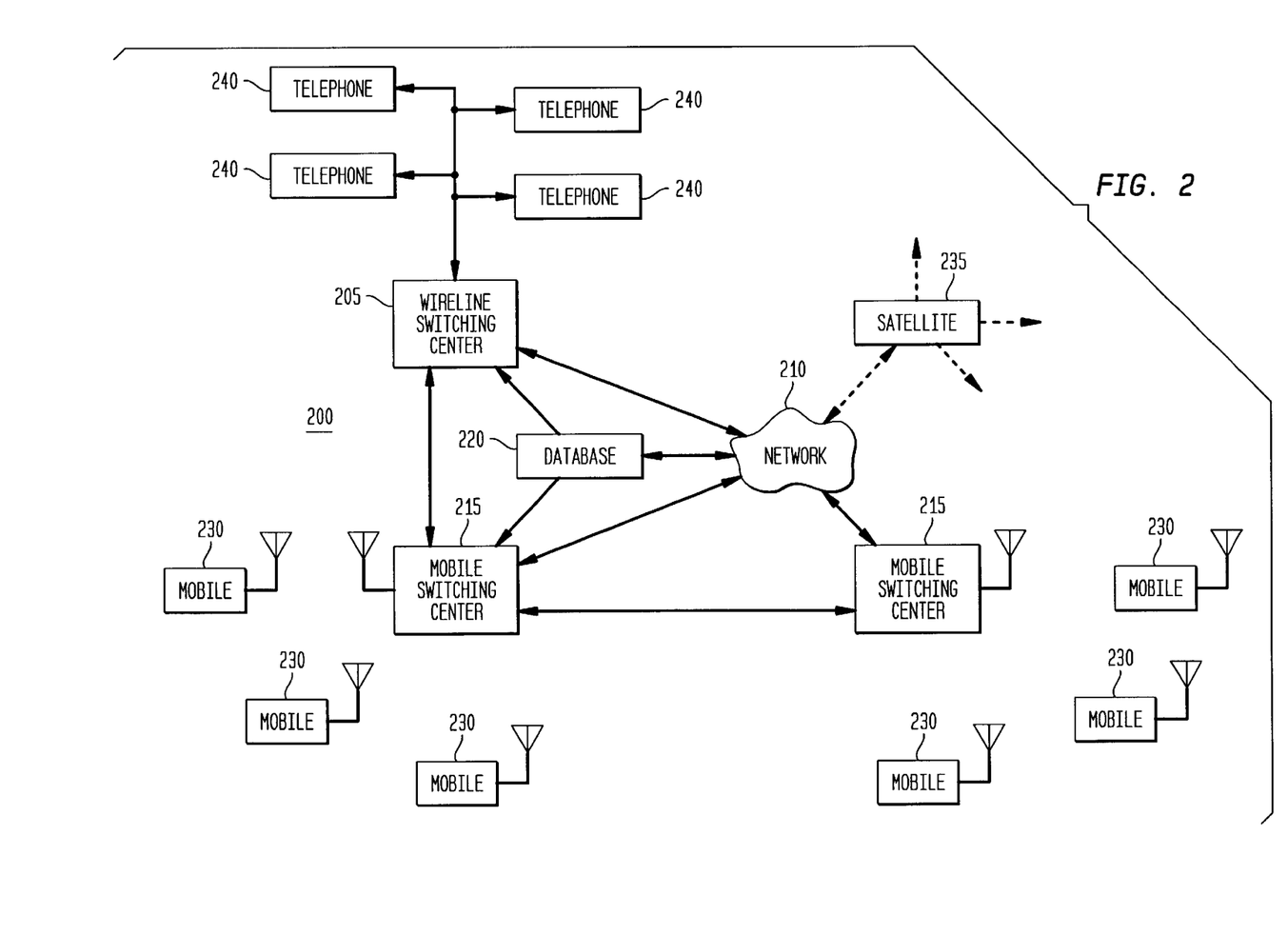
FIG. 2 a block diagram illustrating a first system embodiment for providing conditional answering in multiple leg telecommunication sessions in accordance with the present invention.

FIG. 2 is a block diagram illustrating a first system embodiment 200 in accordance with the present invention. The system 200 includes one or more mobile switching centers ("MSCs") 215 and one or more wireline switching centers 205, which may be connected via trunk and signaling lines to each other and to a broader network 210, such as a PSTN or ISDN network, thereby providing multiple telecommunication connections to other locations, such as providing a link to a satellite 235. The system 200 also includes a database 220, which is preferably connected or coupled to a wireline switching center 205 and to the MSC 215. A database 220 may also be directly included or integrated within the various switching centers 205 and 215.

The wireline switching center 205 is generally connected to a plurality of telephones 240 or other customer premise equipment. Alternatively, via base stations or other wireless transceivers (not separately illustrated), the MSCs 215 typically have a wireless link to the various mobile units 230, such as cellular telephones within a particular geographic region. The wireline and mobile switching centers 205 and 215 usually are also typically physically separated due to regulatory and other historical reasons. These switching centers, however, may be combined into one or more switching centers having both wireline and wireless functionalities.

Continuing to refer to FIG. 2, either the wireline switching center 205 or one of the mobile switching centers 215 receives an incoming call directed to a primary DN. The switching center 205 or 215 then transmits a request to database 220 for an alerting list containing the secondary DNs associated with the primary or pilot DN (such as a termination list). The database 220 transmits a response to the corresponding switching center 205 or 215. The response may contain or list the associated DNs and any corresponding routing and timing parameters (disclosed in the related applications), or may request that the switch obtain additional information from the calling party.

For example, in response to a request from a switching center 205 or 215, the database 220 may provide the switch with an announcement list, for options to be played to the calling party, as previously specified in creating (or modifying) the particular alerting group. When announcement messages have been played, the calling party then enters associated choices, such as language choices (e.g., pressing "1" for English, "2" for Spanish), or other service or equipment choices (e.g., pressing "1" for cellular services, "2" for wireline services, "3" for data services, and so on). In addition, the calling party may also be requested to speak his or her name, or company, etc. This responsive information is then transmitted by the switch (205 or 215) to the database 220. Based on this responsive information, the database 220 may then make various determinations (based upon the calling party's input) and generate an appropriate listing of secondary DNs (selected as a subset from the available secondary DNs of the total alerting group), such the secondary DNs of those alerting group members who are fluent in Spanish. The database 220 then transmits (to the switching center 205 or 215) this listing of secondary DNs (with associated routing and timing parameters, and with any further information to be transmitted to the called parties), for corresponding routing and conditional answering of the outgoing call legs.

For conditional answering, the system 200 may be configured in various ways. In a first embodiment, the system is pre-configured for conditional answering, such that entry of pre-established code or pressing a particular key by the called party is automatically interpreted as a conditional answer, such as entry of a "*SEND" when answering (with entry of "SEND" interpreted as an unconditional answer). In an alternative embodiment of the present invention, the system 200 is configured for unconditional answering (as a default). To provide conditional answering, a new parameter may be included one of the response messages from the database 220 to the switch (205 or 215), which indicates that the outgoing call legs may be conditionally answered (referred to herein as a conditional answering ("CA") parameter). In that alternative embodiment, the absence of the conditional answering parameter in the response message is a default setting indicating normal or typical handling of answered outgoing call legs (i.e., any answer is an unconditional answer).

As indicated above, following routing of the various outgoing call legs by the switch (205 or 215) and alerting of the various called parties, in accordance with the present invention, any of the outgoing call legs may be conditionally answered, with the called party receiving any of the various types of called party information discussed above. Following reception of such information, a conditionally answering called party may then unconditionally answer the outgoing call leg, or may release the outgoing call leg. Alternatively, with or without a conditional answer, any of the outgoing call legs may also be unconditionally answered. As mentioned above, any such unconditionally answered outgoing call leg is connected to the incoming call leg, for a communication session with the calling party, with all remaining outgoing call legs then being released or torn down.

Figure 3:
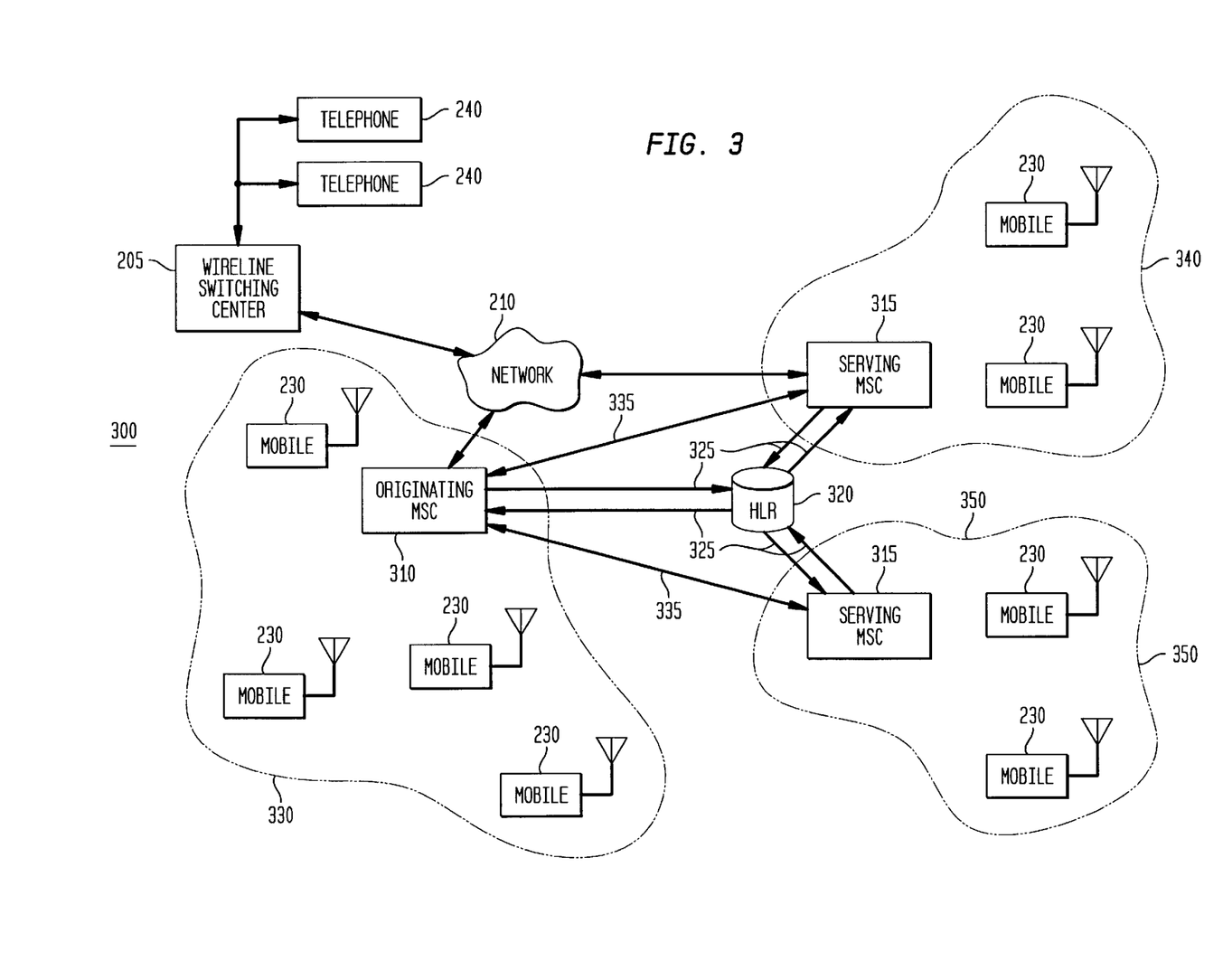
FIG. 3 is a block diagram illustrating a second system embodiment for providing conditional answering in multiple leg telecommunication sessions for wireless communication in accordance with the present invention

FIG. 3 is a block diagram illustrating a second, preferred system embodiment 300 for wireless communication in accordance with the present invention, such as for ANSI-41 flexible alerting. In this system 300, two types of MSCs represent the mobile switching centers 215. The first type of MSC, referred to as an originating MSC 310, receives an incoming call leg designating a primary DN, generates the plurality of outgoing call legs to the associated secondary DNs, and directly provides service to the mobile units 230 within its designated or predetermined geographic region 330. The second type of MSC, referred to as a serving MSC 315, provides service to mobile units 230 that have traveled or roamed into their designated or predetermined geographic regions 340 and 350. A stand-alone home location register ("HLR") 320 is illustrated, to implement the database 220 and other ANSI-41 signaling functionality. (Alternatively, an integrated HLR may also be utilized, in which HLR functionality is included within each MSC 310 and 315.) The various MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections. (As in FIG. 2, base stations or other wireless transceivers are not separately illustrated).

Referring to FIG. 3, when an originating MSC 310 receives an incoming call designating a primary DN, the originating MSC 310 transmits a query or other message to an HLR 320. Such a query is typically in the form of a data packet, and includes a reference to the pilot DN or other primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call from one of the mobile units 230 or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320. The location request or query is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the primary DN is for a flexible alerting group (or other multi-leg communications group), and if so, the HLR 320 prepares a response or other message for transmission to the originating MSC 310. As mentioned above, if the HLR 320 is configured to obtain or request more information (from the calling party, via the MSC 310), the HLR 320 prepares and transmits a response message, indicating the type of information to be collected, as discussed above. In the preferred embodiment, the response message is an ANSI-41 compatible RemoteUserInteractionDirective with an AnnouncementList. This response message directs the originating MSC 310 to output or play the various designated prompts or other messages to the calling party, and to obtain the requested information, such as touch tone (DTMF) responses or a recording of a calling party name. The information collected by the originating MSC 310 is transmitted to the HLR 320, preferably in the form of an ANSI-41 compatible RemoteInteractionDirective with DialedDigits. Based upon this information and its configuration for the particular alerting group, the HLR 320 then determines what information should be included in a response, including a listing of selected secondary DNs, appropriate routing and timing parameters, a conditional answer parameter (to indicate that the alerting group should be provided with this service, also as discussed above), and other called party information to be provided on the outgoing call legs.

Following this determination, or following a location request when the HLR 320 does not request additional information from the originating MSC 310, the HLR 320 generates a message (for transmission to the originating MSC 310) containing or listing the selected secondary DNs that are to be alerted, and containing some or all of the called party information, such as text for display. In the preferred embodiment, the response data packet listing the secondary DNs is provided in a TerminationList of an ANSI-41 compatible LocationRequest RETURN RESULT ("LRRR"). In addition, depending upon system 300 configuration, as mentioned above, the HLR 320 may also include within the response message a conditional answer parameter, to provide this service for the flexible alerting session. As disclosed in the related applications, the HLR 320 may also have obtained routing information for roaming mobile units 230, and if so, additional messaging may have occurred between the HLR 320 and the serving MSCs The originating MSC 310, utilizing the data contained in the response data packet (the secondary DNs, their corresponding routing parameters, called party information, and optionally a conditional answer parameter, included within an LRRR), begins processing and routing each outgoing call leg to each secondary DN. If and when one or more of these outgoing call legs is conditionally answered, by going off-hook or entering a predesignated code such as *SEND, the originating MSC 310 transmits called party information to the called party on each of the conditionally answered outgoing call leg(s), and maintains an open connection between the incoming call leg and the conditionally answered outgoing call leg(s). During this time, other outgoing call legs may be conditionally or unconditionally answered, and any unanswered outgoing call legs may also be released or dropped according to their respective no answer time parameters ("NAT").

A called party of one of the conditionally answered outgoing call legs, having received the called party information, may subsequently decide whether to unconditionally answer the call leg or to release the call leg. In addition, any of the called parties of the other outgoing call legs may also decide to unconditionally answer their respective outgoing call leg. Whichever called party is first to unconditionally answer an outgoing call leg, such as by entering a code or pressing the "SEND" button, that outgoing call leg is connected to the incoming call leg by the MSC 310, and the other remaining outgoing call leg are released or dropped (also by the MSC 310). Conversely, for any conditionally answered outgoing call leg, in the event that the called party does not want to unconditionally answer, the called party may simply go on-hook or press an "END" button. The MSC 310 then releases that outgoing call leg, all transparently to the calling party.

In the preferred embodiment, the outgoing call leg is conditionally answered by entering a code, such as by pressing the * button followed by the SEND button (i.e., *SEND). As mentioned above, other alternatives are available, for instance, for utilizing different screening options, such as off-hook providing an unconditional answer, *SEND providing a conditional answer, and various positive or negative screening alternatives for different alerting groups, such as 3SEND to provide a conditional answer for the user's predefined flexible alerting group number three, or 2SEND to provide a conditional answer for all of the user's predefined flexible alerting groups except number 2.

Figure 4:
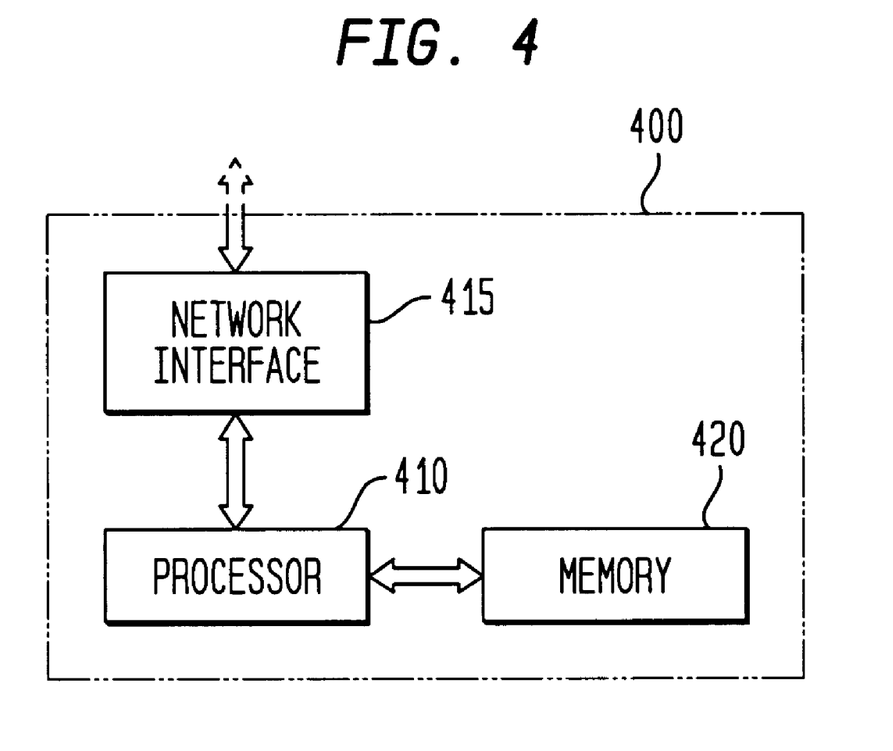
FIG. 4 is a block diagram illustrating an apparatus embodiment for providing conditional answering in multiple leg telecommunication sessions in accordance with the present invention.

FIG. 4 is a block diagram illustrating an apparatus embodiment 400 in accordance with the present invention. As discussed in greater detail below, the apparatus 400 may be included within an MSC (310 or 315), or distributed among an MSC (310 or 315) and HLR 320 of a system 300, or may be included within a switch 205 or 215, or distributed among a switching center 205 or 215 and database 220 of system 200. The apparatus 400 includes a network interface 415, a processor 410, and a memory 420.

The network interface 415 is utilized to receive an incoming call leg to a pilot DN or primary DN, and to transmit the plurality of outgoing call legs to the secondary DNs associated with a primary DN. For example, in system 300, the network interface 415 may be couplable to the network 210 (via trunk and signaling lines) for transmission and reception of PSTN calls. The network interface 415 may also be couplable (via trunk and signaling lines) to a base station (not illustrated) for transmission and reception of wireless calls. The network interface 415 may also be utilized to receive and transmit messages, such as to receive and transmit a location request or query, and to receive and transmit a response message containing a listing of secondary DNs, called party information, and a conditional answer parameter (if any).

The memory 420 is used to store data pertaining to primary DNs, associated secondary DNs, any various subgroups of the secondary DNs (such as those pertinent to language preferences, etc.), routing parameters, answering parameters, a conditional answer parameter, other call placement and routing information, and the call progress information of the related inventions. The memory 420 may be a magnetic hard drive, an optical storage device, an integrated circuit, or any other type of data storage apparatus. The memory 420 also performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), field programmable gate arrays ("FPGAs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, SRAM, DRAM, MRAM, ROM, EPROM or $E^2$PROM. The methodology of the invention, as discussed above with reference to FIGS. 1–3 and as discussed below with reference to FIG. 5, may be programmed and stored, in the processor 420 with its associated memory and other equivalent components, as a set of instructions (or other configuration) for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may be distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

Figure 5:
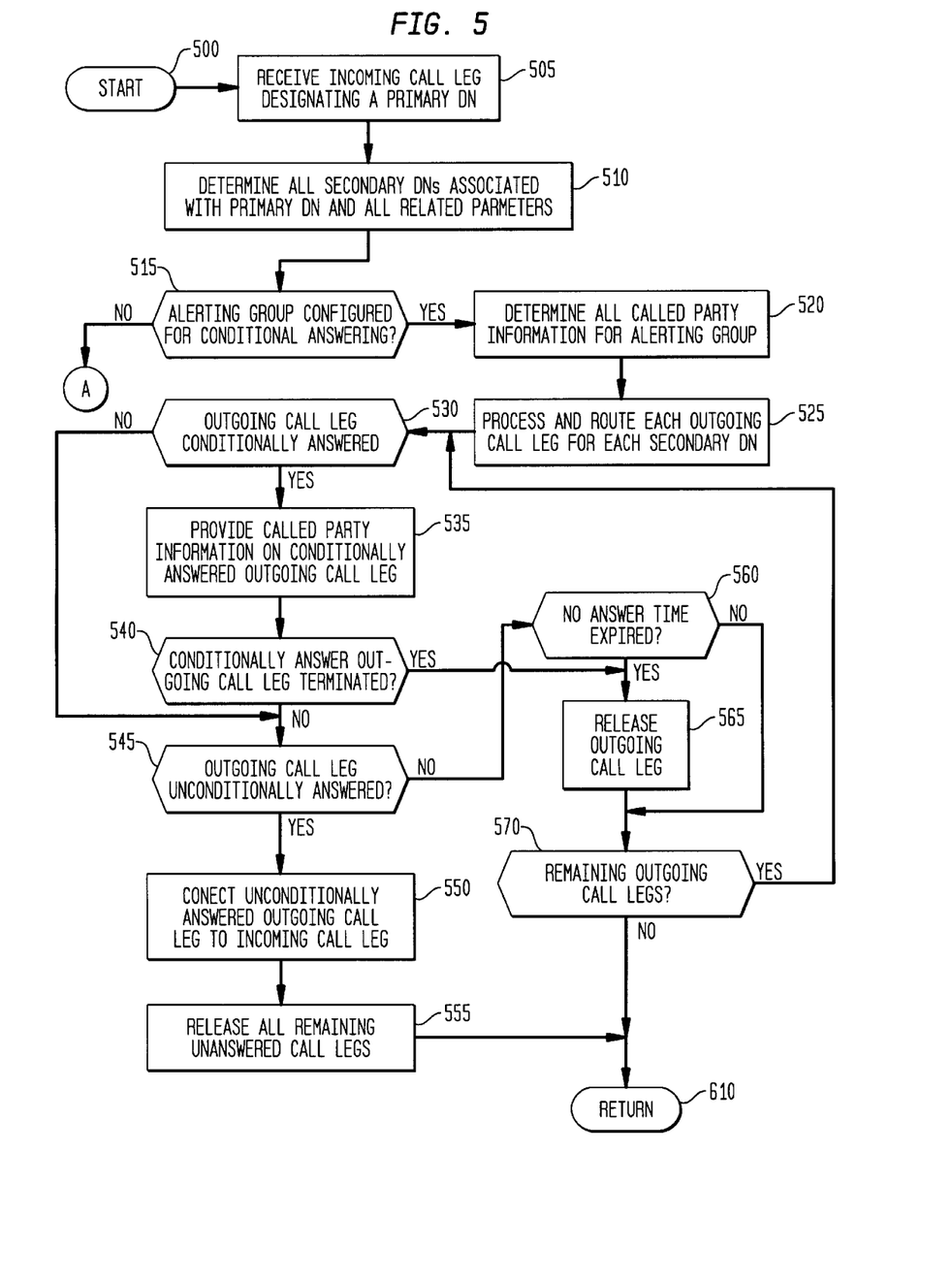
FIG. 5 is a flow diagram illustrating a method embodiment for providing conditional answering in multiple leg telecommunication sessions in accordance with the present invention.

FIG. 5 is a flow diagram illustrating a method embodiment for providing conditional answering in multiple leg telecommunication sessions in accordance with the present invention. The method begins, start step 500, with the reception of an incoming call leg designating a primary DN, step 505, such as reception by an MSC (310 or 315) of an incoming call leg designating a pilot DN of the ANSI-41 specification. Next, in step 510, the method determines all of the secondary DNs associated with the primary DN (as part of the alerting group) and all related parameters, such as determines whether the alerting group (and/or primary DN) is configured for conditional answering, as well as determining any timing, routing and/or no answer time parameters (as disclosed in the related applications). As indicated above, step 510 is usually performed by an HLR 320 in the preferred embodiment, following a query from the originating MSC 310 to the HLR 320, such as an ANSI-41 LocationRequest.

Following step 510, the method determines whether the multiple leg telecommunication session is configured for conditional answering, step 515, such as whether the alerting group parameters include a conditional answer parameter. When the multiple leg telecommunication session is not configured for conditional answering in step 515, the method proceeds to step 575 and processes the multiple leg telecommunication session according to its default or other designated mode, such as the default processing mode discussed in greater detail below (with respect to steps 575 through 605). When the multiple leg telecommunication session is configured for conditional answering (step 515) the method proceeds to step 520, and determines or obtains any and all called party information for the alerting group. As discussed above, this step is preferably performed as several substeps, with corresponding messaging, by and between the HLR 320 and MSC 310, with interaction with and input from the calling party, such as through responses to prompts or recorded verbal responses.

Following step 520, the method processes and routes each outgoing call leg, of the plurality of outgoing call legs, corresponding to each of the secondary DNs of the alerting group, step 525. In the preferred embodiment, such processing also preferably utilizes the various timing, routing and no answer time parameters of the related applications. The method then monitors each of the outgoing call legs to determine whether a call leg has been conditionally answered, step 530. When an outgoing call leg has been conditionally answered in step 530, such as by entering a code or sequence such as *TALK or #SEND, the method proceeds to step 535 and provides called party information to the called party on the conditionally answered outgoing call leg. For example, depending upon the configuration of the alerting group specified by the subscriber, an MSC 310 will provide called party information such as the primary DN called, the total number of outgoing call legs alerted, distinguishing information (such as a distinctive identifier of the alerting group), or other information requested from the calling party, as discussed above. As discussed above, for a conditionally answered outgoing call leg, no connection or communication link is created between the incoming call leg and the conditionally answered outgoing call leg. Following step 535, the method determines whether the called party of the conditionally answered outgoing call leg has terminated (or released) the call, step 540, such as by the called party going on hook, pressing an "END" button, or otherwise hanging up the call. When the conditionally answered call has been terminated in step 540, the method proceeds to step 565 and releases that outgoing call leg. When the conditionally answered outgoing call leg has not been released in step 540, or when the outgoing call leg was not conditionally answered in step 530, the method proceeds to step 545.

In step 545, the method determines whether the outgoing call leg was unconditionally answered, such as by pressing a button or entering a code (e.g., TALK or SEND). When the outgoing call leg has been unconditionally answered in step 545, the method (via MSC 310) connects the unconditionally answered outgoing call leg to the incoming call leg to form a communication session, step 550. Following this creation of a communication session, the method releases all remaining outgoing call legs, step 555, and the method may end, return step 610.

When the outgoing call leg has not been unconditionally answered in step 545, the method (via MSC 310) determines whether a no answer time period has expired, step 560, as disclosed in the related applications. When the no answer time period has expired for the (unanswered) outgoing call leg in step 560, that unanswered outgoing call leg is released, step 565. When the no answer time period has not expired for the (unanswered) outgoing call leg in step 560, and following step 565, the method determines whether there are remaining outgoing call legs to be monitored, step 570. When there are remaining outgoing call legs to be monitored in step 570, the method returns to step 530 and monitors each remaining outgoing call leg (for conditional answering, unconditional answering, and/or termination). When there are no remaining outgoing call legs to be monitored in step 570, the method also may end, return step 610.

As mentioned above, when an alerting group has not been configured for conditional answering (as determined in step 515), the method will provide default processing for the multiple leg telecommunication session, such as the default processing of step 575 through 605. In the preferred embodiment, such default (or regular) processing is quite similar to the processing discussed above, but without the additional conditional answering features. In step 575, for the default mode, the method also processes and routes each outgoing call leg, of the plurality of outgoing call legs, corresponding to each of the secondary DNs of the alerting group. In the preferred embodiment, such processing also preferably utilizes the various timing, routing and no answer time parameters of the related applications.

Without providing conditional answering, in step 580, the method determines whether the outgoing call leg was answered (i.e., unconditionally answered), such as by pressing a button or entering a code (e.g., TALK or SEND). When the outgoing call leg has been answered in step 580, the method (via MSC 310) connects the answered outgoing call leg to the incoming call leg to form a communication session, step 585. Following this creation of a communication session, the method also releases all remaining outgoing call legs, step 590, and the method may end, return step 610.

When the outgoing call leg has not been answered in step 580, the method (via MSC 310) also determines whether a no answer time period has expired, step 595, as disclosed in the related applications. When the no answer time period has expired for the (unanswered) outgoing call leg in step 595, that unanswered outgoing call leg is released, step 600. When the no answer time period has not expired for the (unanswered) outgoing call leg in step 595, and following step 600, the method also determines whether there are remaining outgoing call legs to be monitored, step 605. When there are remaining outgoing call legs to be monitored in step 605, the method returns to step 580 and monitors each remaining outgoing call leg for answering. When there are no remaining outgoing call legs to be monitored in step 605, the method also may end, return step 610.

In addition to the methodology illustrated in FIG. 5, other equivalent variations are available. For example, rather than specifying a single conditional answer state or parameter for the entire alerting group as a whole, each secondary DN may be configured individually for conditional answering, such as having an individual conditional answer parameter. An alerting group would then have a corresponding set of conditional answer parameters, with processing and routing of outgoing call legs potentially proceeding along both the conditional answering path (steps 515 through 570) and the default path (steps 575 through 605) discussed above. A corresponding methodology for call processing will be apparent to those of skill in the art. For example, for that situation, the method would determine whether the particular secondary DN were configured for conditional answering. When not configured for conditional answering, the corresponding outgoing call leg would be handled in a default mode, such that when answered, the answered outgoing call leg would be connected to the incoming call leg, with the release of the remaining unanswered call legs. When the secondary DN is configured for conditional answering, called party information would also be obtained and provided on a conditionally answered call leg, with the balance of the call processing proceeding as described above.

Numerous advantages of the present invention may be apparent from the above discussion. First, the apparatus, method and system of the present invention both allow a called party to conditionally answer an incoming call and provide a called party with additional types of information, enabling a significant level of call screening. In the preferred embodiment, the additional, called party information includes call routing information, call purpose information, and other types of information designated by the consumer. For example, the information provided to the called party may include responses from the calling party, such as option or menu selections, or may identify specific flexible alerting groups, providing the called party with information pertaining to the purpose or routing of the call. The various embodiments of the present invention also provide an alerted party with the ability to conditionally answer an incoming call and receive the additional information, without being connected to the calling party and without releasing or dropping other outgoing call legs to other members of the alerting group. In addition, the apparatus, method and system of the present invention are user friendly, user transparent, and capable of implementation in existing telecommunication equipment.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method of providing conditional answering in a multiple leg telecommunication session, the method comprising:
   (a) receiving an incoming call leg designating a primary directory number;
   (b) determining a plurality of secondary directory numbers associated with the primary directory number;
   (c) processing and routing each outgoing call leg associated with each secondary directory number, of the plurality of secondary directory numbers;
   (d) when an outgoing call leg, of the plurality of outgoing call legs, has been conditionally answered, providing called party information on the conditionally answered outgoing call leg; and
   (e) when an outgoing call leg, of the plurality of outgoing call legs, has been unconditionally answered, providing a connection between the unconditionally answered outgoing call leg and the incoming call leg to form a communication session.

2. The method of claim 1, wherein step (b) further comprises:
   determining the called party information.

3. The method of claim 2, further comprising:
   providing a listing of a plurality of options to a calling party;
   in response, receiving an option selection from the calling party; and
   based upon the option selection, determining the called party information.

4. The method of claim 3, wherein the plurality of options includes a language selection.

5. The method of claim 3, wherein the plurality of options includes a service selection.

6. The method of claim 3, wherein the plurality of options includes a product selection.

7. The method of claim 3, wherein the plurality of options are designated in an ANSI-41 compatible Announcement List.

8. The method of claim 2, further comprising:
   providing a listing of a plurality of options to a calling party;
   in response, receiving an option selection from the calling party; and
   based upon the option selection, determining the plurality of secondary directory numbers.

9. The method of claim 2, further comprising:
   requesting a name from a calling party;
   storing in a memory a calling party name received in response; and
   including the calling party name in the called party information.

10. The method of claim 1, wherein a conditional answering is indicated by entry of a predetermined code on an outgoing call leg of the plurality of outgoing call legs.

11. The method of claim 1, wherein a conditional answering is indicated by an off hook signal on an outgoing call leg of the plurality of outgoing call legs.

12. The method of claim 1, further comprising:
   when a conditionally answered outgoing call leg has not provided an unconditional answer within a predetermined period of time, releasing the conditionally answered outgoing call leg.

13. The method of claim 1, further comprising:
   subsequent to the formation of the communication session, releasing all remaining outgoing call legs of the plurality of outgoing call legs.

14. The method of claim 1, wherein the called party information includes the primary directory number.

15. The method of claim 1, wherein the called party information includes a distinctive identifier for the multiple leg telecommunication session.

16. The method of claim 1, wherein the called party information includes an indication of an amount of outgoing call legs in the plurality of outgoing call legs.

17. A system for providing conditional answering in a multiple leg telecommunication session, the system comprising:
   a database, the database having stored in a memory a plurality of secondary directory numbers associated with a primary directory number; and
   a switching center coupled to the database, the switching center having an interface for receiving an incoming call leg designating the primary directory number and for processing and routing each outgoing call leg associated with each secondary directory number, of the plurality of secondary directory numbers; the switching center further providing, when an outgoing call leg of the plurality of outgoing call legs has been conditionally answered, called party information on the conditionally answered outgoing call leg; and the switching center further providing, when an outgoing call leg of the plurality of outgoing call legs has been unconditionally answered, a connection between the unconditionally answered outgoing call leg and the incoming call leg to form a communication session.

18. The system of claim 17, wherein the database determines the called party information.

19. The system of claim 17, wherein the switching center further provides a listing of a plurality of options to a calling party, and in response, receives an option selection from the calling party; and wherein the database, based upon the option selection, determines the called party information.

20. The system of claim 19, wherein the plurality of options includes a language selection.

21. The system of claim 19, wherein the plurality of options includes a service selection.

22. The system of claim 19, wherein the plurality of options includes a product selection.

23. The system of claim 19, wherein the plurality of options are designated in an ANSI-41 compatible Announcement List transmitted from the database to the switching center.

24. The system of claim 17, wherein the switching center further provides a listing of a plurality of options to a calling party, and in response, receives an option selection from the calling party; and wherein the database, based upon the option selection, determines the plurality of secondary directory numbers.

25. The system of claim 17, wherein the switching center further requests a name from a calling party, stores in a memory a calling party name received in response, and includes the calling party name in the called party information.

26. The system of claim 17, wherein a conditional answering is indicated by entry of a predetermined code on an outgoing call leg of the plurality of outgoing call legs.

27. The system of claim 17, wherein a conditional answering is indicated by an off hook signal on an outgoing call leg of the plurality of outgoing call legs.

28. The system of claim 17, wherein the switching center, when a conditionally answered outgoing call leg has not provided an unconditional answer within a predetermined period of time, releases the conditionally answered outgoing call leg.

29. The system of claim 17, wherein the switching center, subsequent to the formation of the communication session, releases all remaining outgoing call legs of the plurality of outgoing call legs.

30. The system of claim 17, wherein the called party information includes the primary directory number.

31. The system of claim 17, wherein the called party information includes a distinctive identifier for the multiple leg telecommunication session.

32. The system of claim 17, wherein the called party information includes an indication of an amount of outgoing call legs in the plurality of outgoing call legs.

33. The system of claim 17, wherein the switching center is a mobile switching center and the database is a home location register.

34. An apparatus for providing conditional answering in a multiple leg telecommunication session, the apparatus comprising:
    a network interface for reception of an incoming call leg designating a primary directory number and for transmission of a plurality of outgoing call legs;
    a memory having a plurality of secondary directory numbers associated with the primary directory number; and
    a processor coupled to the memory and the network interface, wherein the processor, when operative, includes instructions to process and route each outgoing call leg associated with each secondary directory number, of the plurality of secondary directory numbers; the processor including further instructions, when an outgoing call leg of the plurality of outgoing call legs has been conditionally answered, to provide called party information on the conditionally answered outgoing call leg; and the processor including further instructions, when an outgoing call leg of the plurality of outgoing call legs has been unconditionally answered, to provide a connection between the unconditionally answered outgoing call leg and the incoming call leg to form a communication session.

35. The apparatus of claim 34, wherein the processor determines the called party information.

36. The apparatus of claim 35, wherein the processor includes further instructions to provide a listing of a plurality of options to a calling party, and in response, to receive an option selection from the calling party, and based upon the option selection, to determine the called party information.

37. The apparatus of claim 36, wherein the plurality of options includes a language selection.

38. The apparatus of claim 36, wherein the plurality of options includes a service selection.

39. The apparatus of claim 36, wherein the plurality of options includes a product selection.

40. The apparatus of claim 36, wherein the plurality of options are designated in an ANSI-41 compatible Announcement List transferred from the memory to the processor.

41. The apparatus of claim 35, wherein the processor includes further instructions to provide a listing of a plurality of options to a calling party, and in response, to receive an option selection from the calling party, and based upon the option selection, to determine the plurality of secondary directory numbers.

42. The apparatus of claim 35, wherein the processor includes further instructions to request a name from a calling party, to store in the memory a calling party name received in response, and to include the calling party name in the called party information.

43. The apparatus of claim 34, wherein a conditional answering is indicated by entry of a predetermined code on an outgoing call leg of the plurality of outgoing call legs.

44. The apparatus of claim 34, wherein a conditional answering is indicated by an off hook signal on an outgoing call leg of the plurality of outgoing call legs.

45. The apparatus of claim 34, wherein the processor includes further instructions, when a conditionally answered outgoing call leg has not provided an unconditional answer within a predetermined period of time, to release the conditionally answered outgoing call leg.

46. The apparatus of claim 34, wherein the processor includes further instructions, subsequent to the formation of the communication session, to release all remaining outgoing call legs of the plurality of outgoing call legs.

47. The apparatus of claim 34, wherein the called party information includes the primary directory number.

48. The apparatus of claim 34, wherein the called party information includes a distinctive identifier for the multiple leg telecommunication session.

49. The apparatus of claim 34, wherein the called party information includes an indication of an amount of outgoing call legs in the plurality of outgoing call legs.

50. A system for providing conditional answering in a multiple leg telecommunication session, the system comprising:
    a home location register, the home location register having stored in a memory, in association with a pilot directory number, a plurality of secondary directory numbers and instructions for determining called party information; and a mobile switching center coupled to the home location register, the mobile switching center having an interface for receiving an incoming call leg designating the pilot directory number and for processing and routing each outgoing call leg associated with each secondary directory number, of the plurality of secondary directory numbers; the mobile switching center, following reception of a directive from the home location register, obtaining information from a calling party for a determination of called party information; the mobile switching center further providing, when an outgoing call leg of the plurality of outgoing call legs has been conditionally answered, called party information on the conditionally answered outgoing call leg; and the mobile switching center further providing, when an outgoing call leg of the plurality of outgoing call legs has been unconditionally answered, a connection between the unconditionally answered outgoing call leg and the incoming call leg to form a communication session.

51. The system of claim 50, wherein the directive to the mobile switching center from the home location register is an ANSI-41 compatible AnnouncementList designating a plurality of options, and wherein the mobile switching center further provides a listing of the plurality of options to the calling party, and in response, receives an option selection from the calling party and transmits the option selection to the home location register, and wherein the home location register, based upon the option selection, determines the called party information.

52. The system of claim 50, wherein the directive to the mobile switching center from the home location register is an ANSI-41 compatible AnnouncementList designating a plurality of options, and wherein the mobile switching center further provides a listing of the plurality of options to the calling party, and in response, receives an option selection from the calling party and transmits the option selection to the home location register; and wherein the home location register, based upon the option selection, determines the plurality of secondary directory numbers.

53. The system of claim 50, wherein the plurality of options are predesignated by a subscriber from a set of selections, the set of selections including a language selection, a service selection, and a product selection.

54. The system of claim 50, wherein a plurality of types of information forming called party information are predesignated by a subscriber from a set of types of information, the set of types of information including calling party name information, the pilot directory number, a distinctive identifier for the multiple leg telecommunication session, and an indication of an amount of outgoing call legs in the plurality of outgoing call legs.

* * * * *